US009229775B2

(12) United States Patent
Dai et al.

(10) Patent No.: US 9,229,775 B2
(45) Date of Patent: *Jan. 5, 2016

(54) DYNAMICALLY ADJUSTING GLOBAL HEAP ALLOCATION IN MULTI-THREAD ENVIRONMENT

(71) Applicant: International Business Machines Corporation, Armonk, NY (US)

(72) Inventors: Xiao Jun Dai, Beijing (CN); Rui Bo Han, Beijing (CN); Wei Liu, Beijing (CN); Zhi Da Luo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 342 days.

This patent is subject to a terminal disclaimer.

(21) Appl. No.: 13/851,540

(22) Filed: Mar. 27, 2013

(65) Prior Publication Data

US 2013/0263149 A1    Oct. 3, 2013

(30) Foreign Application Priority Data

Mar. 28, 2012   (CN) .......................... 2012 1 0086688

(51) Int. Cl.
*G06F 9/46* (2006.01)
*G06F 12/00* (2006.01)
*G06F 9/50* (2006.01)
*G06F 12/02* (2006.01)

(52) U.S. Cl.
CPC .............. *G06F 9/5016* (2013.01); *G06F 12/02* (2013.01); *G06F 12/0284* (2013.01); *G06F 12/023* (2013.01)

(58) Field of Classification Search
None
See application file for complete search history.

(56) References Cited

U.S. PATENT DOCUMENTS

| 6,219,772 | B1 | 4/2001 | Gadangi et al. |
| 6,427,195 | B1 | 7/2002 | McGowen et al. |
| 6,848,033 | B2 | 1/2005 | Joseph et al. |
| 7,035,989 | B1 | 4/2006 | Boucher et al. |
| 7,111,294 | B2 | 9/2006 | Steensgaard et al. |

(Continued)

OTHER PUBLICATIONS

Dai et al., "Dynamically Adjusting Global Heap Allocation in Multi-Thread Environment," U.S. Appl. No. 14/487,139, filed Sep. 16, 2014, 25 pages.

(Continued)

*Primary Examiner* — Tammy Lee
(74) *Attorney, Agent, or Firm* — Yee & Associates, P.C.; Lisa Ulrich (57) ABSTRACT

Global heap allocation technologies in a multi-thread environment, and particularly to a system for dynamically adjusting global heap allocation in the multi-thread environment, and more particularly to a method and system for dynamically adjusting global heap allocation by monitoring conflict parameters of the global heap allocation method. The present invention provides a system for dynamically adjusting global heap allocation in multi-thread environment, comprising: identifying a global heap allocation method in an application program; judging whether the global heap allocation method is a multi-thread conflict hot point; and using a local stack to allocate memory space requested by the global heap allocation method in response to a "yes" judging result. The system according to the present invention is adapted to purposefully dynamically adjust the intrinsic global heap allocation method in the program according to a real-time running state, reduce the lock contention on the global heap, and effectively improve a resource allocating efficiency and a resource utilization rate.

9 Claims, 5 Drawing Sheets

(56) References Cited

U.S. PATENT DOCUMENTS

| | | | |
|---|---|---|---|
| 7,240,169 B2 | 7/2007 | Dennie et al. | |
| 7,558,935 B1* | 7/2009 | Boucher et al. | 711/170 |
| 8,024,505 B2 | 9/2011 | Dahlstedt et al. | |
| 2002/0095453 A1 | 7/2002 | Steensgaard et al. | |
| 2002/0199069 A1 | 12/2002 | Joseph et al. | |
| 2004/0034742 A1* | 2/2004 | Field et al. | 711/132 |
| 2008/0120627 A1* | 5/2008 | Krauss | 719/328 |
| 2008/0134158 A1 | 6/2008 | Salz et al. | |
| 2011/0119660 A1* | 5/2011 | Tanaka | 717/149 |

OTHER PUBLICATIONS

Attardi et al., "A Comparison of Memory Allocators in Multiprocessors," dsc.sun.com, Oracle Corporation, Jun. 2003, 6 pages (dsc.sun.com/solaris/articles/multiproc.html).

Michael, "Scalable Lock-Free Dynamic Memory Allocation," Proc. of the ACM SIGPLAN Conference on Programming Language Design and Implementation, vol. 39, Issue 6, May 2004, pp. 35-46.

Tallent et al., "Effective Performance Measurement and Analysis of Multithreaded Applications", Proc. of the 14th ACM SIGPLAN Symposium on Principles and Practice of Parallel Programming, Feb. 2009, 11 pages.

Xu et al., "Dynamic Instrumentation of Threaded Applications", Proceedings of 7th ACM SIGPLAN Symposium on Principles and Practice of Parallel Programming, May 1999, 11 pages.

Office Action, dated May 20, 2015, regarding U.S. Appl. No. 14/487,139, 20 pages.

* cited by examiner

DYNAMICALLY ADJUSTING GLOBAL HEAP ALLOCATION IN MULTI-THREAD ENVIRONMENT

FIELD

The present invention relates to global heap allocation technologies in multi-thread environment, and more specifically, to a method and system for dynamically adjusting global heap allocation by monitoring conflict parameters of the global heap allocation method.

BACKGROUND

Figure 2A:
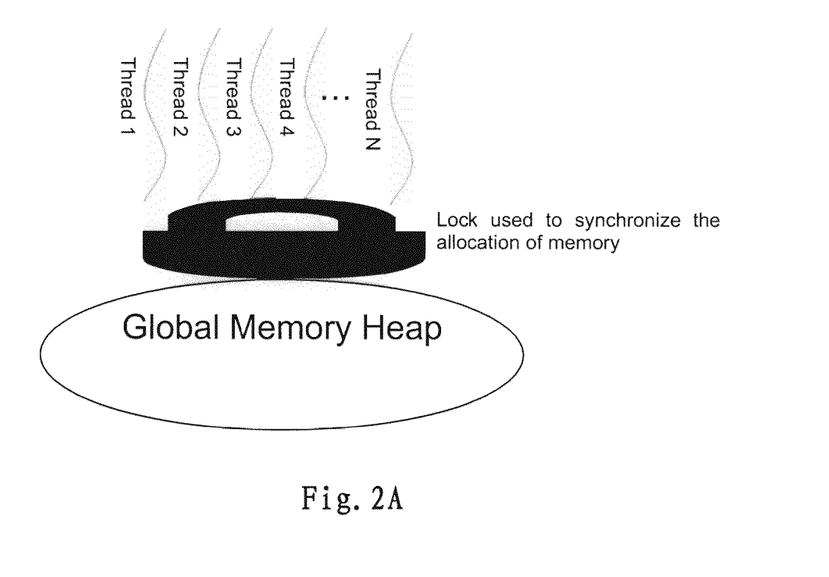
FIG. 2A illustrates a situation of lock contention when a plurality of threads share a global memory heap.

At present, with the development of computer multi-core technologies, a multi-thread program is applied more and more extensively. There are two major problems with the multi-thread environment: one is resource sharing, namely, a plurality of threads share a physical memory of the same entity; the other is resource synchronization, namely, the multi-thread environment requires the physical memory of the same entity to be accessed by only one thread at the same time. As can be seen from the above, resource sharing and resource synchronization are two requirements which are contradictory to each other. On the premise of ensuring the resource sharing, when the plurality of threads simultaneously request for allocation of the global heap, "lock contention" will occur That is to say, a thread requesting later must wait for being unlocked until the shared memory allocation is completed by a thread that requests earlier, thereby performing memory allocation. If the number of the threads simultaneously requesting for memory allocation is too large, the running speed of the program will drop, thereby causing phenomena such as "breakdown" or even "system crash." FIG. 2A illustrates one example of this situation. As illustrated in FIG. 2A, the threads 1-N need to share the global memory heap. As required by resource synchronization, allocation of the global memory heap can be carried out for only one thread at the same time, and other threads must be in a locked state waiting for synchronization of the memory resource.

Figure 2B:
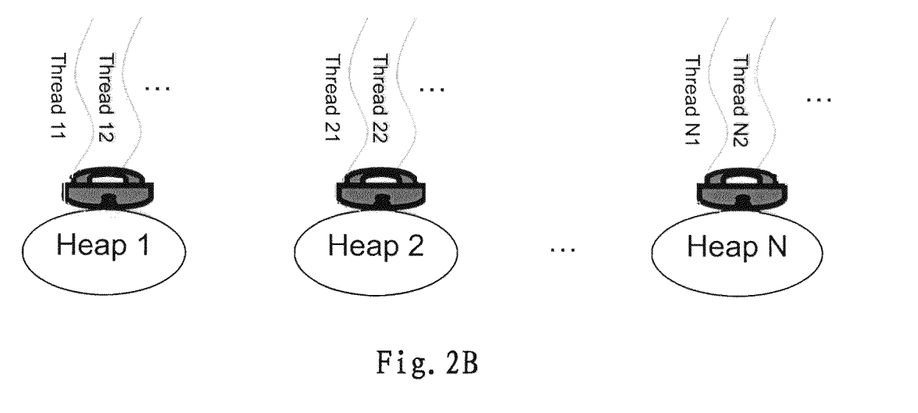
FIG. 2B illustrates a schematic view of dividing the shared global memory heap into a plurality of shared memory sub-heaps to address the problem illustrated in FIG. 2A in the prior art.

There is a technical solution to the above problem in the prior art, as illustrated in FIG. 2B, the shared global memory heap in FIG. 2A is divided into a plurality of sub-heaps Heap1-HeapN, and several threads are allocated for each sub-heap. The technical solution indeed can ease the lock contention to a certain degree, but each of the sub-heaps is allocated with several threads, so the lock contention issue still exists. More importantly, upon division of sub-heaps and allocation of threads, it is impossible to know which threads should be allocated to which sub-heaps so as to achieve the best running effect. Hence, it often occurs that the sub-heap Heap 1 is in an idle state whereas the sub-heap Heap 2 is already in a lock contention state, thereby causing a waste of the memory resource and a lot of memory fragments.

SUMMARY

In view of the above problems, one of objectives of the present invention is to provide a method and system for dynamically adjusting global heap allocation in multi-thread environment.

According to one aspect of the present invention, there is provided a method of dynamically adjusting global heap allocation in multi-thread environment, comprising: identifying a global heap allocation method in an application program; judging whether the global heap allocation method is a multi-thread conflict hot point; and using a local stack to allocate memory space requested by the global heap allocation method in response to a "yes" judging result.

According to one embodiment of the present invention, wherein judging whether the global heap allocation method is a multi-thread conflict hot point comprises:

Judging whether the global heap allocation method is a multi-thread conflict hot point by monitoring the multi-thread conflict parameters of the global heap allocation method in real time, wherein the multi-thread conflict parameters comprise one or more of the following parameters: times of the global heap allocation method having been called in a unit time; the global memory space requested by the global heap allocation method for allocation; and times of lock contention of the global heap allocation method having occurred in a unit time.

According to another aspect of the present invention, there is provided a system for dynamically adjusting global heap allocation in multi-thread environment, comprising: identifying module configured to identify a global heap allocation method in an application program; judging module configured to judge whether the global heap allocation method is a multi-thread conflict hot point; and adjusting module configured to use the local stack to allocate the memory space requested by the global heap allocation method in response to a "yes" judging result.

According to the method or system provided by the present invention, whether to use the local stack to allocate the memory space requested by the original global heap allocation method is decided by judging whether the global heap allocation method in the program is a multi-thread conflict hot point, so as to pertinently and dynamically adjust the intrinsic global heap allocation method in the program according to a real-time running state, reduce the lock contention occurring to the global heap, and effectively improve resource allocating efficiency and resource utilization rate.

BRIEF DESCRIPTION OF THE SEVERAL VIEWS OF THE DRAWINGS

Through the more detailed description of some embodiments of the present disclosure in the accompanying drawings, the above and other features of the present disclosure will become more apparent, wherein the same reference generally refers to the same or like components in the embodiments of the present disclosure. Among the figures.

DETAILED DESCRIPTION

In the text below, the method and system provided by the present invention will be described in detail by way of embodiments with reference to the figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
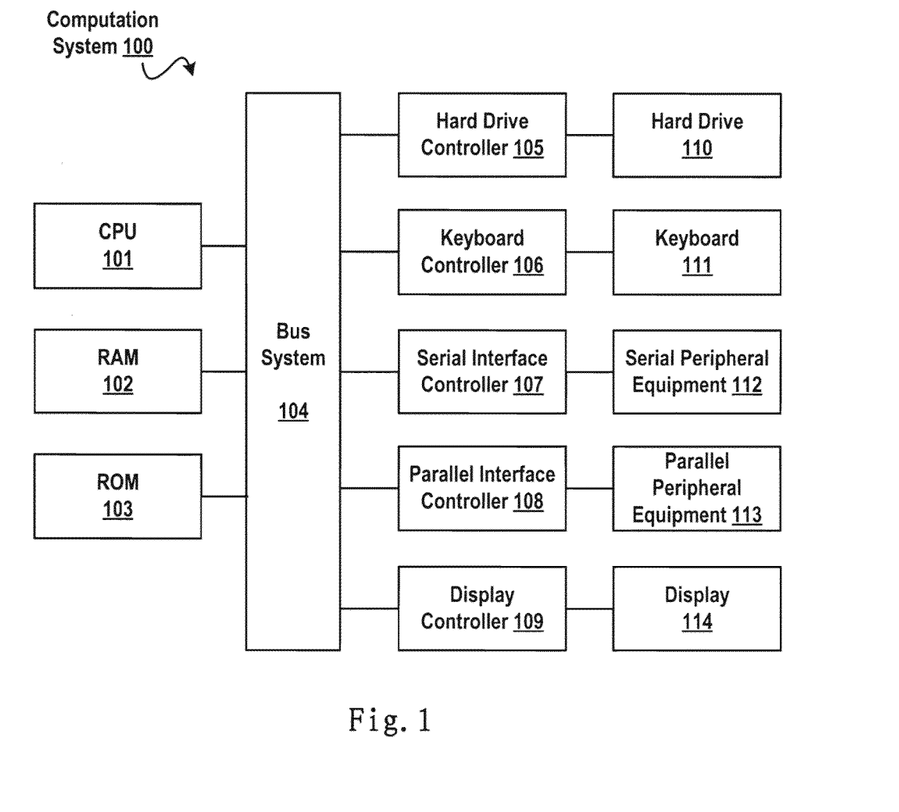
FIG. 1 illustrates a block diagram of an exemplary computer system 100 adapted to implement embodiments of the present invention.

With reference now to FIG. 1, FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

Figure 3:
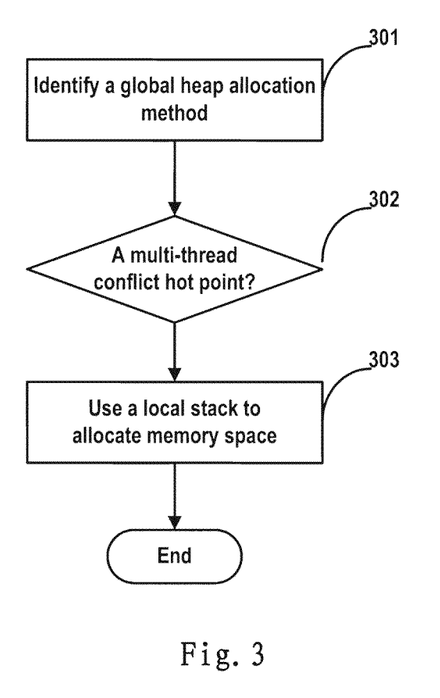
FIG. 3 illustrates a flow chart of a method of dynamically adjusting the global heap allocation in multi-thread environment according to one embodiment of the present invention.

FIG. 3 illustrates a flow chart of a method of dynamically adjusting the global heap allocation in multi-thread environment according to one embodiment of the present invention. The method illustrated in FIG. 3 starts with step 301 at which a global heap allocation method in an application program is identified.

First, two concepts need to be clarified: global heap and local stack. The global heap is also called global memory heap and refers to memory space shared by a plurality of threads, whereas the local stack refers to memory space exclusive to each of the plurality of threads. Usually, the global heap is designated and allocated by application program developers during programming, for example, in C language, it is usual to use malloc instructions to allocate memory from the global heap. The local stack is automatically allocated during application program compiling, and the program developers usually do not designate allocation of the local stack during coding the program, which is also unnecessary. Certainly, it is theoretically possible to allocate memory from the local stack by way of alloca instructions, for example.

A concept to be defined next is a global heap allocation method. The global heap allocation method refers to a method, function or functionality in the program code for allocating memory space from the global heap. For example, malloc ( . . . ) is an example of a global heap allocation method in C language. Those skilled in the art should appreciate that specific expression forms of the global heap allocation method vary with programming languages or source codes or object codes. For example, in advanced language such as Java or C++, a statement such as "Object a=new Object ( )" is usually used to achieve the global heap allocation, and it is also a global heap allocation method.

The prior art has already provided a technical solution regarding a method of identifying different types in a program code and scope of the method. The technical solution will not be detailed herein. It should be noted that, at step 301, the global heap allocation method can be identified either by scanning the source code of the program or scanning the object code of the program, which depends on the type and the format of the source code and object code of the programming language.

Next, at step 302 is judged whether the global heap allocation method is a multi-thread conflict hot point. The multi-thread conflict hot point herein means that in the multi-thread environment, execution of the global heap allocation method will make lock contention of the global heap allocation prominent, which indicates a need to adjust the global heap allocation method, i.e., allowing the program to quit from lock contention upon execution of the global heap allocation method. Embodiments about judging whether the global heap allocation method is a multi-thread conflict hot point will be described in detail with reference to FIG. 4.

According to one embodiment of the present invention, at step 303 a mode of enabling the program to quit from the lock contention upon execution of the global heap allocation method is using the local stack to allocate the memory space requested by the identified global heap allocation method (namely, the original global heap allocation method). As stated above, the local stack refers to memory space exclusive to each of the plurality of threads, so using the local stack to allocate the memory space requested by the original global heap allocation method does not affect other threads or make lock contention in the global memory heap more acute; on the contrary, it reduces the conflict degree of lock contention of the original global memory heap.

According to one embodiment of the present invention, the identified global heap allocation method in the application program is an if-condition branch statement including the local stack allocation and the global heap allocation, and the if-condition is whether the global heap allocation method is a multi-thread conflict hot point. A specific example of the global heap allocation method including the if-condition branch statement is presented as follows:

```
If (this memory allocation is not the hot point) {
    instrument ( mlloca(...) );   // still allocate memory from global heap
    else{
        alloca(...);              // change the memory allocation to thread
                                  // local stack
    }
```

The above global heap allocation method including the if-condition branch statement means that if the memory allocation is not a multi-thread conflict hot point, the global heap allocation method is executed; otherwise, the local stack allocation method is executed.

According to one embodiment of the present invention, the above global heap allocation method including the if-condition branch statement is coded by a program developer during programming According to another embodiment of the present invention, the above global heap allocation method including the if-condition branch statement is obtained by modifying the original global heap allocation method in the application program in a way of code injection. In this case, the original global heap allocation method (namely, the global heap allocation method coded by the program developer) can be for example malloc( . . . ); //allocate memory from global heap To sum up, by method illustrated in FIG. 3, whether to use the local stack to allocate the memory space requested by the original global heap allocation method is decided by judging whether the global heap allocation method in the program is a multi-thread conflict hot point, so as to pertinently and dynamically adjust the intrinsic global heap allocation method in the program according to a real-time running state, reduce the lock contention on the global heap, and effectively improve resource allocating efficiency and resource utilization rate.

Figure 4:
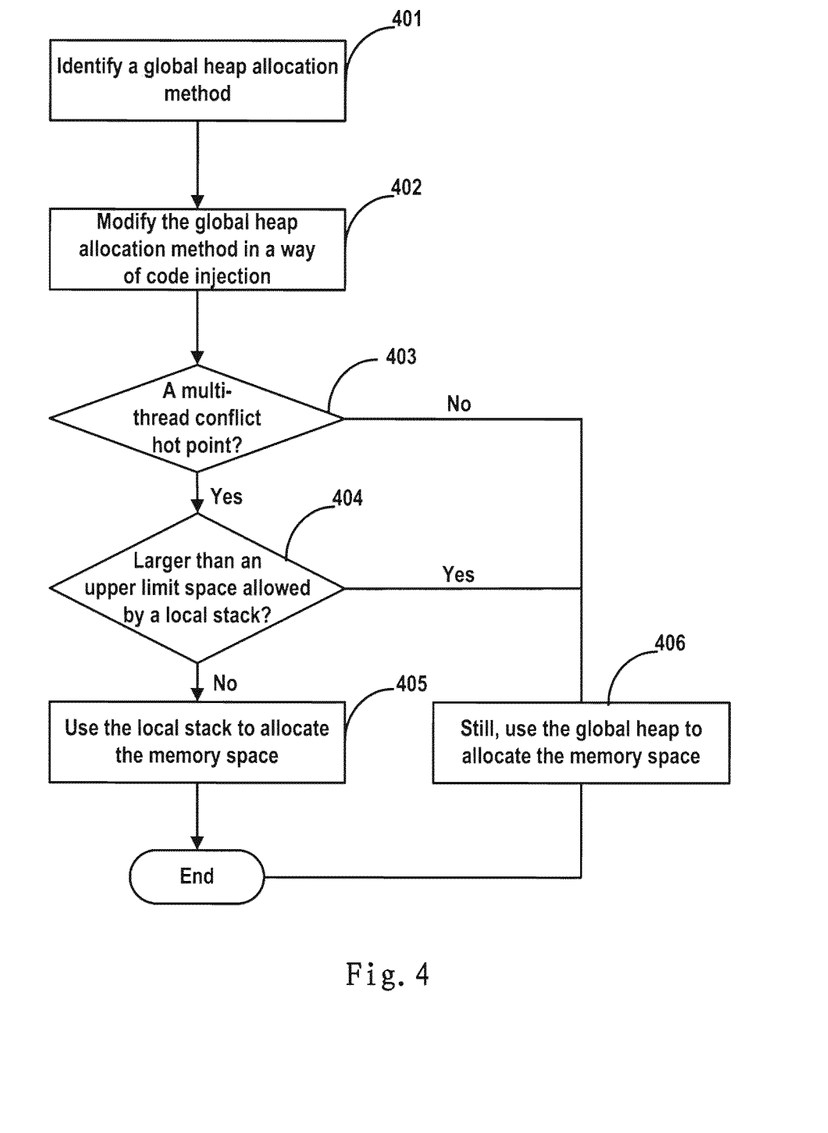
FIG. 4 illustrates a flow chart of a method of dynamically adjusting the global heap allocation in multi-thread environment according to another embodiment of the present invention.

FIG. 4 illustrates a flow chart of a method of dynamically adjusting the global heap allocation in multi-thread environment according to another embodiment of the present invention.

The method illustrated in FIG. 4 starts with step 401. At step 401, the global heap allocation method in the application program is identified. Step 401 corresponds to step 301 in the method illustrated in FIG. 3, and thus will not be detailed herein. At step 402, the global heap allocation method is modified by code injection so that the original global heap allocation method is modified as an if-condition branch statement including the local stack allocation and the global heap allocation. The example of the specific if-condition branch statement is already presented in the preceding text and is not repeated here. It should be noted that the code injection in step 402 is not a requisite step. Upon programming, the program developer can code the global heap allocation method as the global heap allocation method including the if-condition branch statement so that the step of code injection is not needed. It should be further noted that, modification of the global heap allocation method by means of code injection does not mean certainty to modify the original program code itself. Alternatively, "if-condition branch logic" is added only during compiling or actual running, whereas the original program code does not change. Those skilled in the art should appreciate that code injection is technical means in the prior art. Details for implementing code injection will not be described here. Furthermore, the code injection can be implemented either at the source code level or at the object code level, which depends on a specific program code type.

Next, at step 403 is judged whether the global heap allocation method is a multi-thread conflict hot point. It is appreciated that step 403 corresponds to step 302 in the method illustrated in FIG. 3. According to one embodiment of the present invention, whether the global heap allocation method is a multi-thread conflict hot point is judged by monitoring the multi-thread conflict parameter of the global heap allocation method in real time. According to one embodiment of the present invention, the multi-thread conflict parameters comprise one or more of the following parameters: times of the global heap allocation method having been called in a unit time; the global memory space requested by the global heap allocation method for allocation; and times of lock contention of the global heap allocation method having occurred in a unit time. It should be noted that the above parameter types and quantity as monitored are not fixed. On the basis of understanding of the idea of the present invention, those skilled in the art can surely introduce many other types of parameters, such as lock wait time. Whether the global heap allocation method is a multi-thread conflict hot point or not can be judged by means of parameter values monitored during the program running process according to a preset rule. A specific example of the preset rule is as follows: "if (lock contention times/method call times)>90% and times of the method having been called in the unit time >1000, then it is believed that the global heap allocation method is a multi-thread conflict hot point." Those skilled in the art should appreciate that the rule can be set in many combinations or changes according to the difference of specific program types, code types and program running environments. Furthermore, the global heap allocation method with the if-condition branch statement represents itself as a setting of rule. The concept of the present invention will not be affected no matter where there is another preset rule.

According to one embodiment of the present invention, the above monitoring of parameters is triggered regularly, for example, the parameters are monitored once per 5 seconds or per 2 seconds. According to another embodiment of the present invention, the unit time for the parameters can be preset, for example, the times of the method having been called and the times of the lock contention having occurred are obtained per 3 seconds. Since the monitoring of the parameters is performed during runtime of the program in real-time, the global heap allocation can be adjusted dynamically according to the monitoring results in real-time running. It is possible that memory is allocated from the local stack at one time, whereas the memory allocation is adjusted such that memory is allocated from the global heap when monitoring is triggered next time.

It should be noted that, the monitoring of the above types of parameters can be implemented by technical means in the prior art. Different monitoring means depend on specific implementation platforms or running environments. For example, the parameter "times of the global heap allocation method having been called in a unit time" can be obtained by using the tool tprof on an AIX platform, and obtained by using operafile on a linux platform. The parameter "times of lock contention of the global heap allocation method having occurred in a unit time" can be obtained by using Java Lock Monitor in Java, and obtained by using Lock Trace of DB2 under an environment of DB2.

If the judging result at step 403 is "yes," the flow goes on to step 404 at which is judged whether the memory space requested by the global stack allocation method is larger than an upper limit space allowed by the local stack for allocation. As the memory space allowed by the local stack usually has a certain upper limit, which depends on different platform environment. For example, a default space of the local stack is sized as 1M in Window environment, 2M in Linux environment, 0.75M for 32-bits application and 1.5M for 64-bits application in AIX environment. Those skilled in the art should understand that although different platforms might have default upper limit space of the local stack, a user can voluntarily set or change the size of the default space. An objective of judgment at step 404 is: if the global heap allocation method is a multi-thread conflict hot point but the memory space requested by the global heap allocation method for allocation exceeds the default upper limit space of the local stack, then the flow needs to go forward to step 406 (i.e., the judging result of step 404 is yes), and the global heap is still used to allocate the memory space. If the judgment result of step 404 is no, the flow goes to step 405 at which the local stack is used to allocate the memory space requested by the global heap allocation method.

If the judging result of step 403 is "no," this indicates that the global heap allocation method is not a multi-thread conflict hot point, so the flow goes to step 406, where the global heap is still used to allocate the memory space.

It should be noted that, the upper limit space allowed by the local stack for allocation can completely serve as a monitoring parameter, that is, serve as a basis for judging whether the global heap allocation method is a multi-thread conflict hot point at step 403. In other words, the judgment at step 404 is not requisite. The step is particularly illustrated in FIG. 4 in order to illustrate possible changes to the technical solution and embodiments in detail.

Figure 5:
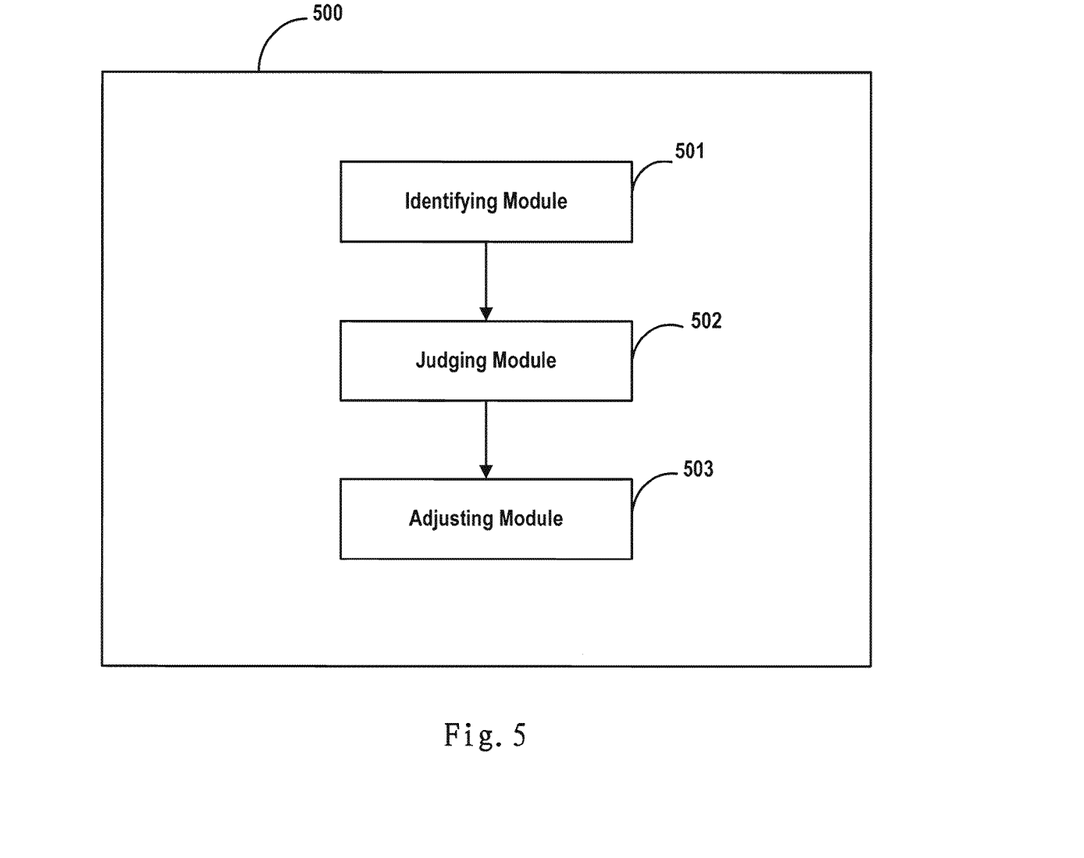
FIG. 5 illustrates a block diagram of a system for dynamically adjusting the global heap allocation in multi-thread environment according to a further embodiment of the present invention.

FIG. 5 illustrates a block diagram of a system for dynamically adjusting the global heap allocation in multi-thread environment according to a further embodiment of the present invention. The system illustrated in FIG. 5 is on the whole denoted by a system 500. Specifically, the system 500 comprises identifying module 501 configured to identify a global heap allocation method in an application program; judging module 502 configured to judge whether the global heap allocation method is a multi-thread conflict hot point; and adjusting module 503 configured to use the local stack to allocate the memory space requested by the global heap allocation method in response to a "yes" judging result. Those skilled in the art should appreciate that the modules 501-503 in the system illustrated in FIG. 5 correspond to steps 301-303 in the method illustrated in FIG. 3, respectively. Details will not be described here.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for dynamically adjusting global heap allocation in multi-thread environment, comprising a data processor coupled to a storage device having program code embodied therein that includes:
    an identifying module configured to identify a global heap allocation method in an application program, wherein the global heap allocation method is a method used by the application program to allocate memory space from a global heap memory space shared by a plurality of threads in the multi-threaded environment;
    a judging module configured to judge whether the global heap allocation method is a multi-thread conflict hot point by monitoring multi-thread conflict parameters of the global heap allocation method in real time, wherein the multi-thread conflict parameters comprise one or more of the following parameters:
        (i) times of the global heap allocation method having been called in a unit time;
        (ii) an amount of the memory space requested by the global heap allocation method for allocation;
        (iii) times of lock contention of the global heap allocation method having occurred in a unit time; and
        (iv) lock wait time waiting for a lock; and
    an adjusting module configured to use a local stack in lieu of the global heap memory space to allocate the memory space requested by the global heap allocation method in response to a judging result that indicates that the global heap allocation method is the multi-thread conflict hot point.

2. The system according to claim 1, the adjusting module is further configured to:
    use the global heap to allocate the memory space requested by the global heap allocation method in response to a judging result that indicates that the global heap allocation method is not the multi-thread conflict hot point.

3. The system according to claim 1, wherein the adjusting module is configured to:
    judge whether the memory space requested by the global heap allocation method is larger than an upper limit space allowed by the local stack for allocation in response to the judging result that indicates that the global heap allocation method is the multi-thread conflict hot point;
    use the global heap to allocate the memory space requested by the global heap allocation method in response to the memory space requested by the global heap allocation method being larger than the upper limit space allowed by the local stack for allocation; and
    use the local stack to allocate the memory space requested by the global heap allocation method in response to the memory space requested by the global heap allocation method not being larger than the upper limit space allowed by the local stack for allocation.

4. The system according to claim 3, wherein a value of the upper limit space allowed by the local stack for allocation is a preset value not larger than a value of a maximum space of the local stack.

5. The system according to claim 1, wherein the identified global heap allocation method in the application program is an if-condition branch statement including the local stack allocation and the global heap allocation, and the if-condition is whether the global heap allocation method is the multi-thread conflict hot point.

6. The system according to claim 5, wherein the if-condition branch statement is obtained by modifying the original global heap allocation method in the application program in a way of code injection.

7. The system according to claim 1, wherein the local stack is a memory allocation space exclusive to each of a plurality of threads, and the global heap is a memory allocation space shared by the plurality of threads.

8. A computer program product for dynamically adjusting global heap allocation in multi-thread environment, the computer program product comprising a non-transitory computer readable storage device readable by a processing circuit and storing instructions for execution by the processing circuit for performing steps of:
    identifying a global heap allocation method in an application program, wherein the global heap allocation method is a method used by the application program to allocate memory space from a global heap memory space shared by a plurality of threads in the multi-threaded environment;
    judging whether the global heap allocation method is a multi-thread conflict hot point by monitoring multi-thread conflict parameters of the global heap allocation method in real time, wherein the multi-thread conflict parameters comprise one or more of the following parameters:
        (i) times of the global heap allocation method having been called in a unit time;
        (ii) an amount of the memory space requested by the global heap allocation method for allocation; and
        (iii) times of lock contention of the global heap allocation method having occurred in a unit time; and
        (iv) lock wait time waiting for a lock; and
    using a local stack in lieu of the global heap memory space to allocate the memory space requested by the global heap allocation method in response to a judging result that indicates that the global heap allocation method is the multi-thread conflict hot point.

9. A computer program stored on a non-transitory computer readable device and loadable into an internal memory of a digital computer, comprising software code portions, when said computer program is run on the digital computer, for performing the steps of:
    identifying a global heap allocation method in an application program, wherein the global heap allocation method is a method used by the application program to allocate memory space from a global heap memory space shared by a plurality of threads in the multi-threaded environment;
    judging whether the global heap allocation method is a multi-thread conflict hot point by monitoring multi-thread conflict parameters of the global heap allocation method in real time, wherein the multi-thread conflict parameters comprise one or more of the following parameters:
        (i) times of the global heap allocation method having been called in a unit time;

(ii) an amount of the memory space requested by the global heap allocation method for allocation; and
(iii) times of lock contention of the global heap allocation method having occurred in a unit time; and
(iv) lock wait time waiting for a lock; and using a local stack in lieu of the global heap memory space to allocate the memory space requested by the global heap allocation method in response to a judging result that indicates that the global heap allocation method is the multi-thread conflict hot point.

* * * * *